United States Patent [19]

Sekmakas et al.

[11] Patent Number: 4,525,510
[45] Date of Patent: Jun. 25, 1985

[54] THERMOSETTING LATEX COATING COMPOSITIONS PRODUCED BY COPOLYMERIZATION IN AQUEOUS EMULSION IN THE PRESENCE OF WATER-INSOLUBLE POLYHYDRIC ALCOHOL

[75] Inventors: Kazys Sekmakas, Palatine; Raj Shah, Schaumburg, both of Ill.

[73] Assignee: DeSoto, Inc., Des Plaines, Ill.

[21] Appl. No.: 234,953

[22] Filed: Feb. 17, 1981

Related U.S. Application Data

[63] Continuation-in-part of Ser. No. 111,076, Jan. 10, 1976, Pat. No. 4,321,176.

[51] Int. Cl.$^3$ ............... C08K 5/42; C08K 5/41
[52] U.S. Cl. .................... 524/156; 524/161; 524/366; 524/372; 524/247; 524/389; 524/500; 524/555
[58] Field of Search ............... 526/303, 304; 524/156, 524/161, 247, 366, 372, 389, 500

[56] References Cited

U.S. PATENT DOCUMENTS

| | | | |
|---|---|---|---|
| 3,300,439 | 1/1967 | Chloupek | 526/303 X |
| 3,650,998 | 3/1972 | Sekmakas | 260/29.6 TA |
| 4,005,052 | 1/1977 | Sekmakas | 260/29.6 TA |
| 4,229,336 | 10/1980 | Sicklesteel | 526/304 X |
| 4,239,671 | 12/1980 | Fink | 526/303 X |
| 4,265,796 | 5/1981 | Mueller-Mall | 260/29.6 R |
| 4,267,091 | 5/1981 | Geelhaar | 526/315 X |
| 4,272,423 | 6/1981 | Hirano | 260/29.6 TA |

*Primary Examiner*—Christopher A. Henderson
*Attorney, Agent, or Firm*—Dressler, Goldsmith, Shore, Sutker & Milnamow, Ltd.

[57] ABSTRACT

A thermosetting latex coating composition is disclosed and comprises a copolymer of monoethylenically unsaturated monomers copolymerized in aqueous emulsion in the presence of an anionic surfactant and about 1% to about 25% of a liquid water-insoluble polyhydric alcohol. The monomers include at least about 80% of nonreactive monomers and from about 0.5% to about 10% of a monomer carrying a reactive group capable of reacting with the hydroxy groups present when the latex is deposited and dried.

10 Claims, No Drawings

THERMOSETTING LATEX COATING COMPOSITIONS PRODUCED BY COPOLYMERIZATION IN AQUEOUS EMULSION IN THE PRESENCE OF WATER-INSOLUBLE POLYHYDRIC ALCOHOL

DESCRIPTION

This application is a continuation-in-part of our prior application Ser. No. 111,076 filed Jan. 10, 1980, now U.S. Pat. No. 4,321,176 and it includes subject matter which has been divided out of said prior application as a result of a requirement for restriction.

TECHNICAL FIELD

This invention relates to thermosetting latex coating compositions produced by aqueous emulsion copolymerization.

BACKGROUND ART

Conventional aqueous emulsion copolymerization produces a high molecular weight copolymer having limited capacity to coalesce and wet pigment and substrate. It is also difficult to obtain gloss coatings from the conventional latex compositions or to introduce thermosetting capacity into the copolymer. This invention seeks to improve these inadequacies in the prior latex coating compositions.

DISCLOSURE OF INVENTION

In accordance with this invention, monoethylenically unsaturated monomers including a monomer carrying a reactive group described hereinafter, are copolymerized in aqueous emulsion in the presence of a liquid water-insoluble polyhydric alcohol (commonly termed a polyol) which is maintained in emulsion with the aid of an anionic surfactant. The monomers may be dissolved in the polyol as taught in Sekmakas U.S. Pat. No. 4,005,052, or these monomers may be added to an emulsion of the polyol which is maintained at conditions of elevated temperature and catalysis causing polymerization. In either event, the monomers become polymerized in association with the polyol.

The presence of the polyol and the anionic surfactant enables the production of aqueous latex coating compositions having a small average particle size without regard to the monomers which are selected. The fine particle size and the presence of the polyol provides latex coatings which possess superior capacity to coalesce on deposition, they wet the pigment better in pigmented coatings, and they are less subject to pinholing and crawling. Air dry thermosetting coatings possessing some considerable gloss is a feature of this invention. Also, since the cure can be speeded at relatively low temperature, force drying at temperatures up to about 250° F. is also contemplated.

The monomers which are copolymerized include a monomer carrying a reactive group capable of reacting with the hydroxy groups of the polyol during a subsequent bake of the latex after it has been coated upon a substrate. In this way the polyol not only provides the advantages noted before, but it also provides an inexpensive source of hydroxy functionality to facilitate cure. Also, some very limited reaction may occur during the copolymerization, and this assists in achieving a good association of the copolymer with the polyol.

The polyol is preferably liquid at room temperature, but if it is not a liquid, it must be liquefiable at the moderate temperature (40° C. to 90° C.) normally used for emulsion polymerization. The number of hydroxy groups in the polyol is of secondary significance. Dihydric alcohols, such as the addition reaction product of propylene oxide with a bisphenol, such as bisphenol A, are particularly effective and are preferred. However, trihydric alcohols, such as the addition reaction product of ethylene oxide with trimethylol propane having a high enough molecular weight to provide water-insolubility, such as an average molecular weight of about 1700, are also useful. Tetrahydric alcohols such as the addition reaction product of pentaerythritol with ethylene oxide having a molecular weight of about 600 are also useful. Significant water-insolubility to enable a small amount of polyol to be emulsified into a large amount of water is essential, and with such insolubility the desired emulsification requires the aid of a surfactant.

It is preferred to use an adduct of a polyhydric alcohol with an alkylene oxide to provide a polyether which is insoluble in water. The greater the molecular weight, the more hydroxy groups, and the longer the chain length of the alkylene oxide, the greater the water-insolubility. Ethylene oxide, 1,2-propylene oxide and a butylene oxide are all useful.

The proportion of water-insoluble polyol must be small in comparison with the unsaturated monomers which are subjected to copolymerization. On this basis, about 1% to about 25% polyol can be used, preferably from 2% to 15%, based on the weight of the materials which are copolymerized. As previously indicated, the small amount of polyol does a big job for it helps to determine the particle size of the latex, it moderates the molecular weight of the emulsion polymer, it enhances the wetting characteristics and coalescing characteristics of the latex particles, and it provides hydroxy groups to participate in a thermosetting cure.

The proportion of monomer carrying a reactive group capable of reacting with the hydroxy groups of the polyol is also small, and can vary from about 0.5% to about 10%, preferably from 1% to 5% of the weight of the materials being polymerized. Since the copolymer particles have much greater molecular weight than is obtained by polymerization in solvent solution, less cross-linking is required for an effective cure. As is conventional, cure is measured by the increased resistance to coating removal with methyl ethyl ketone.

It is also preferred to use less reactive monomer than polyol, a weight ratio of 1:1.5 to 1:3 being appropriate, and this provides a desirable economy.

The monomers which are copolymerized consist essentially of monoethylenically unsaturated monomers, at least about 80% of which are nonreactive (monomers which do not react under the conditions of polymerization and cure except through their ethylenic unsaturation-usually only the single ethylenic group is present). These nonreactive monomers are illustrated by styrene, vinyl toluene, methyl methacrylate, methyl acrylate, and $C_2$-$C_8$ alkyl acrylates and methacrylates, such as ethyl acrylate and isobutyl methacrylate. Vinyl acetate and acrylonitrile are also useful.

The reactive monomer is preferably an ether blocked N-methylol functional monoethylenic compound, such as isobutoxymethyl acrylamide. The isobutyl ether group is preferred because of its hydrolytic stability and resistance to unblocking at the moderate temperatures used in emulsion polymerization. The alcohol is driven off on subsequent baking (this occurs slowly without baking) which generates N-methylol functionality for cure. The isobutyl ether is illustrative of $C_1$–$C_8$ alcohol ethers, preferably $C_2$–$C_4$ alkyl ethers. Similarly, the preferred N-methylol group can be replaced by N-$C_2$–$C_8$ alkylol, and the acrylamide portion of the monomer can be replaced by methacrylamide or other amide, or allyl carbamate, and the like. These are illustrated by ethoxymethyl methacrylamide and isobutoxymethyl allyl carbamate. If the N-alkylol group is unblocked, some reaction will occur during polymerization, so the proportion of use must be minimized.

Up to about 6% of monoethyleic monomers enhancing the stability of the latex may also be present. In preferred practice from 0.5% to 2% of a carboxy-functional momomer, such as acrylic acid, methacrylic acid, crotonic acid, itaconic acid or maleic acid is present. During of after copolymerization ammonia or an amine may be added to enhance the stability of the latex. On the other hand, a correspondingly small amount of an amine monomer, like dimethyl aminoethyl acrylate, can be used and an acid, like acetic acid will provide stability.

The carboxyl-functional monomer is also reactive with the hydroxy groups of the polyol and with the N-methylol groups of the copolymer, and thus aid in the curing reaction. Similarly, the monomers which are copolymerized may include up to about 5% of an hydroxy monomer, such as an hydroxy alkyl acrylate or methacrylate in which the alkyl group contains from 2–4 carbon atoms, typically 2-hydroxyethyl acrylate.

The surfactants which can be used to emulsify the polyol and the monomers are subject to wide variation, but anionic surfactants are especially useful herein for obtaining fine particle size. When the monomers are in solution in the polyol, the surfactants simultaneously emulsify all of the components of the solution, and the polyol remains in emulsion because of its water insolubility. The preferred anionic surfactants are sodium dodecyl benzene sulfonate and sodium lauryl sulfate. Nonionic surfactants which may be used in combination with the anionic surfactant are illustrated by an octyl or nonyl phenol adducted with from 8 to 40 mols of ethylene oxide per mol of the phenol.

The polymerization is preferably carried out to provide a latex containing from 30% to 65% solids, preferably from 35% to 60% solids, and polymerization catalyst is added to the aqueous phase of the emulsion.

BEST MODE FOR CARRYING OUT THE INVENTION

EXAMPLE 1

450 grams of deionized water, 60 grams of a 30% water solution of sodium lauryl sulfate, 50 grams of propylene oxide adduct of bisphenol A (Polyol 565 of Dow Chemical Co. may be used) and 6 grams of sodium dodecyl benzene sulfonate are emulsified with high speed agitation to form a milky emulsion which is charged into a reactor together with 900 grams of deionized water, 1 gram of sodium dodecyl benzene sulfonate and 6.7 grams of ammonium persulfate catalyst.

There is then separately premixed 600 grams of methyl methacrylate, 480 grams of butyl acrylate, 30 grams of isobutoxymethyl acrylamide, 15 grams of acrylic acid and 3 grams of tertiary dodecyl mercaptan. This monomer mixture is then added to the reactor over a period of 2 hours after the reactor contents have been heated to 70° C. The temperature is maintained at 70° C.–73° C. while the monomers are added and for 30 minutes thereafter to insure conversion of monomer to copolymer.

After completion of copolymerization, the emulsion product is cooled to 35° C. and a mixture of 20 grams of dimethyl ethanol amine, 20 grams of butyl alcohol and 20 grams of deionized water are added to stabilize the emulsion which is then cooled and strained to form a milky emulsion of very fine particle size having a solids content of 45.6% and an acid value of 15.6.

100 grams of the copolymer emulsion of the above emulsion containing 45.6 grams of copolymer solids are slowly added with agitation to 9.12 grams of hexamethoxymethyl melamine dissolved in 50 grams of n-butanol. The resulting coating composition is applied by a wire wound rod onto aluminum panels (24 gauge) to form a film having a thickness of 0.8 mil. After baking 30 seconds in a 450° F. oven, the following film properties are obtained.

| | |
|---|---|
| Gloss (60° Glsssmeter) | 92 |
| Pencil Hardness | F |
| Metal Mark Resistance | Excellent |
| Solvent Resistance (methyl ethyl ketone) | Pass 100 rubs |
| Reverse Impact | 36 in/lbs (no crack) |

EXAMPLE 2

Example 1 is repeated except that the hexamethoxymethyl melamine solution was omitted. The coating was drawn down onto a paper substrate and air dried to form a glossy film which, after exposure to ambient conditions for one week, had cured to form a tough film which resisted dissolution in methyl ethyl ketone. A faster cure (10 to 20 minutes) can be had by force drying at 250° F.

EXAMPLE 3

Example 2 is repeated except that the propylene oxide adduct of bisphenol A was not emulsified into the water solution in the reactor. Instead, the same amount of the same adduct was premixed into the monomer mixture. The product was substantially the same as the product in Example 2 and it cured in the same way.

EXAMPLE 4

Examples 2 and 3 were each repeated using, in place of the adduct of bisphenol A, a corresponding amount of liquid trihydric polyoxypropylene derivative of trimethylol propane having an average molecular weight of 2540, an hydroxyl number (KOH/g.) of 63, and a viscosity of 25° C. of 440 centipoises. In each instance the latex product deposited films which air dried to form glossy thermoset coatings which were almost identical in each instance and very much like those obtained in Examples 2 and 3. Additional aminoplast can be added as in Example 1. Phenoplast resins, especially those soluble in water, can also be used.

Industrial Application

The latex coating compositions of this invention are particularly adapted for reverse roll application to aluminum siding and as a coating for tinplate for the exterior of sanitary cans. They are also useful for air drying paints where the superior pigment wetting characteristics provides many advantages. Rapid low temperature cure for large industrial parts and room temperature curing gloss coatings for the interior of homes are particularly contemplated.

What is claimed is:

1. A thermosetting latex coating composition comprising a copolymer of monoethylenically unsaturated monomers copolymerized in aqueous emulsion in the presence of an anionic surfactant and about 1% to about 25%, based on the weight of the materials which are copolymerized, of a liquid water-insoluble polyhydric alcohol, said monomers including at least about 80% of nonreactive monomers and from about 0.5% to about 10%, based on the weight of the materials which are copolymerized, of a monomer carrying a reactive group capable of reacting with the hydroxy groups present when the latex is deposited and dried, said reactive group being a $C_1$-$C_8$ N-alkylol group etherified with a $C_1$-$C_8$ alcohol.

2. A coating composition as recited in claim 1 in which said reactive monomer carries an N-methylol group etherified with a $C_2$-$C_4$ alkanol.

3. A coating composition as recited in claim 2 in which said reactive monomer is present in an amount of from 1% to 5%, based on the weight of the materials which are copolymerized.

4. A coating composition as recited in claim 3 in which from 0.5% to 2% of a carboxy-functional monomer is present in the copolymer.

5. A coating composition as recited in claim 4 in which ammonia or an amine is added to enhance the stability of the latex.

6. A coating compositiona as recited in claim 1 in which said monomer carrying a reactive group is isobutoxymethyl acrylamide.

7. A coating composition as recited in claim 1 in which said polyhydric alcohol is a water-insoluble adduct of a polyhydric alcohol having from 2-4 hydroxy groups with an alkylene oxide containing from 2-4 carbon atoms.

8. A coating composition as recited in claim 7 in which said polyhydric alcohol is a propylene oxide adduct of a bisphenol.

9. A coating composition as recited in claim 1 in which said polyhydric alcohol is present in an amount of from 2% to 15% of the materials which are copolymerized, and the weight ratio of said polyhydric alcohol to monomer carrying a reactive group is from 1:1.5 to 1:3.

10. A coating composition as recited in claim 1 in which said anionic surfactant is selected from sulfonates and sulfates.

* * * * *